(12) United States Patent
Koryakin et al.

(10) Patent No.: US 10,984,438 B2
(45) Date of Patent: Apr. 20, 2021

(54) TECHNOLOGIES FOR AUTOMATICALLY VALIDATING THE FUNCTIONALITY OF OFFERS IN A CLOUD SERVICE BROKERAGE SYSTEM

(71) Applicant: Ingram Micro, Inc., Irvine, CA (US)

(72) Inventors: Rostislav Koryakin, Moscow (RU); Viacheslav Dubinskii, Moscow (RU); Timur Khakimyanov, Lobnya (RU); Igor Vagulin, Dolgoprudny (RU)

(73) Assignee: INGRAM MICRO INC., Irvine, CA (US)

( * ) Notice: Subject to any disclaimer, the term of this patent is extended or adjusted under 35 U.S.C. 154(b) by 726 days.

(21) Appl. No.: 15/663,182

(22) Filed: Jul. 28, 2017

(65) Prior Publication Data

US 2019/0034957 A1   Jan. 31, 2019

(51) Int. Cl.
*G06Q 30/00* (2012.01)
*G06Q 30/02* (2012.01)

(52) U.S. Cl.
CPC ..... *G06Q 30/0239* (2013.01); *G06Q 30/0225* (2013.01)

(58) Field of Classification Search
CPC ................. G06Q 30/0239; G06Q 30/0225
USPC ....................................................... 705/14.26
See application file for complete search history.

(56) References Cited

U.S. PATENT DOCUMENTS

| 9,542,655 | B1 * | 1/2017 | Chernis | G06N 5/022 |
| 10,083,456 | B2 * | 9/2018 | Abdelrahman | G06Q 30/0202 |
| 10,108,535 | B2 * | 10/2018 | Aggarwal | G06F 11/3672 |

* cited by examiner

*Primary Examiner* — David J Stoltenberg
*Assistant Examiner* — Michael I Ezewoko
(74) *Attorney, Agent, or Firm* — Ice Miller, LLP

(57) ABSTRACT

Technologies for automatically validating the functionality of offers in a cloud service brokerage system include an offer validation computing device configured to identify scenarios of an offer to be validated and generate a series of high-level steps and placeholders for the scenarios of the offer which correspond to an application package associated with a cloud application. The offer validation computing device is further configured to determine one or more low-level steps for each of the placeholders, replace each of the placeholders with a corresponding one or more associated low-level steps, and package the one or more associated low-level steps and the generated high-level steps into a validation tool, which is usable by the cloud service brokerage system to automatically validate the functionality of the scenarios of the offer. Additional embodiments are described herein.

9 Claims, 5 Drawing Sheets

TECHNOLOGIES FOR AUTOMATICALLY VALIDATING THE FUNCTIONALITY OF OFFERS IN A CLOUD SERVICE BROKERAGE SYSTEM

TECHNICAL FIELD OF THE DISCLOSED EMBODIMENTS

The presently disclosed embodiments generally relate to cloud service brokering, and more particularly, to technologies for automatically validating offer functionality to be integrated into a cloud service brokerage system.

BACKGROUND OF THE DISCLOSED EMBODIMENTS

Independent software vendors (ISVs) develop and sell software applications which are typically designed to run on one or more computer hardware or operating system platforms. The ISVs also sell and provide subscriptions to their applications. An application usually provides a set of services, that can be configured according to a user preferences. The ISV provides an application programming interface (API) for each of its application. The API includes a set of classes, procedures, functions, structures and constants provided by the application for use in external applications.

Such ISV developed software applications range from basic utility or productivity enhancing application to business process application for enterprises (e.g., customer relationship management (CRM), enterprise resource planning (ERP), automation tools, etc.). As cloud computing has become more pervasive, one such method of delivering software has been via the cloud using a software as a service (SaaS) based model. Using this delivery method, the ISVs may sell their software applications, or subscriptions to their software applications, through a public cloud or cloud marketplace.

While the cloud marketplace provides an online storefront for customer access to cloud-based services and software applications, a cloud service broker may be used to facilitate the transaction between the ISV and an end user, reseller, retailer, etc., such as by using an integration application or API connector for each cloud service. In traditional cloud service broker implementations, each cloud service broker typically has a contract with each ISV for each cloud service which provides the cloud service broker access to the platform and/or infrastructure, which may be accessed (e.g., via a portal) for creating and managing integration applications, thereby enabling their services to be purchased, provisioned, and executed in the cloud.

Subsequent to an application being developed by an ISV, the cloud service broker typically uploads an application package corresponding to the application to a platform (e.g., a cloud service broker platform). Afterwards, the cloud service broker can form offers with different combinations of resources, services associated with integration cloud applications, and the cloud service broker's billing rules for the next level of resellers from the hierarchy of resellers. Typically, prior to offering the application to consumers, the cloud service broker performs a series of checks to ensure the integrity of the application and to verify the application is functioning as expected. However, such checks are generally performed using manual methods for which the cloud service brokers can incur large costs, both in time and money. Accordingly, there exists a need for improvements in technologies for automatically validating the functionality of offers in a cloud service brokerage system.

SUMMARY OF THE DISCLOSED EMBODIMENTS

In one aspect, a method for automatically validating the functionality of offers in a cloud service brokerage system includes identifying, by an offer validation computing device of the cloud service brokerage system, one or more scenarios of an offer to be validated, wherein the offer is associated with a service plan corresponding to a cloud application; generating, by the offer validation computing device, one or more high-level steps for each of the one or more scenarios; determining, by the offer validation computing device, whether any of the one or more scenarios includes one or more placeholders, wherein each placeholder comprises a step that is not a high-level step; generating, by the offer validation computing device and in response to having determined that at least one of the one or more scenarios includes one or more placeholders, the one or more placeholders for the respective one or more scenarios; determining, by the offer validation computing device, one or more low-level steps for each of the one or more placeholders; replacing, by the offer validation computing device, each of the determined one or more placeholders with a corresponding one or more associated low-level steps of the determined one or more low-level steps; and packaging, by the offer validation computing device, the one or more associated low-level steps and the one or more high-level steps into a validation tool usable to automatically validate the functionality of the one or more scenarios of the offer.

In some embodiments, the method further includes requesting, via a user interface of the offer validation computing device and upon having determined the one or more low-level steps, additional input data from a user; and receiving, via the user interface, the additional input data requested from the user, wherein replacing each of the one or more generated placeholders comprises replacing at least one of the one or more generated placeholders based on the additional input data received from the user. In other embodiments, requesting the additional input data from the user comprises requesting the additional input data from the user in response to a determination that one or more of the low-level steps were undeterminable.

In some embodiments, the method further includes excluding, by the offer validation computing device and upon having determined that one or more of the low-level steps were undeterminable, the scenario from the validation tool. In other embodiments, determining the one or more low-level steps for each of the one or more generated placeholders comprises (i) rendering a hypertext markup language (HTML) view of an interface of the scenario and (ii) determining at least a portion of the one or more low-level steps based on the rendered HTML view of the interface of the scenario.

In some embodiments, the offer includes a service template component that defines a set of services and resources required to perform one or more service scenarios of the offer. In other embodiments, determining the one or more low-level steps for each of the one or more generated placeholders comprises (i) determining one or more application packages associated with a set of resources defined by the service template component, and (ii) determining at least a portion of the one or more low-level steps based on a set of low-level steps contained within at least one of the one or more application packages.

In still other embodiments, the method includes identifying, by the offer validation computing device, a set of resource types as a function of the set of services and resources; and determining one or more application packages corresponding to each of the set of resource types, wherein generating the one or more high-level steps for the one or more scenarios comprises generating the one or more high-level steps as a function of the one or more application packages determined for each of the set of resource types. In some embodiments, the one or more scenarios of the offer comprises at least one of creating a customer, buying a subscription for the customer, creating a service, assigning the service, creating a service user, changing a subscriptions plan, changing a subscription limit, disabling the subscription, terminating the subscription, and invoicing the customer.

In another aspect, an offer validation computing device of the cloud service brokerage system for automatically validating the functionality of offers in the cloud service brokerage system includes one or more computer-readable medium comprising instructions; and one or more processors coupled with the one or more computer-readable medium and configured to execute the instructions to: identify one or more scenarios of an offer to be validated, wherein the offer is associated with a service plan corresponding to a cloud application; generate, in response to having determined that at least one of the one or more scenarios includes one or more placeholders, the one or more placeholders for the respective one or more scenarios; determine one or more low-level steps for each of the one or more placeholders; replace each of the determined one or more placeholders with a corresponding one or more associated low-level steps of the determined one or more low-level steps; and package the one or more associated low-level steps and the one or more high-level steps into a validation tool usable to automatically validate the functionality of the one or more scenarios of the offer.

In some embodiments, wherein the one or more processors are further configured to execute the instructions to request, via a user interface of the offer validation computing device and upon having determined the one or more low-level steps, additional input data from a user; and receive, via the user interface, the additional input data requested from the user, wherein to replace each of the one or more generated placeholders comprises to replace at least one of the one or more generated placeholders based on the additional input data received from the user.

In some embodiments, to request the additional input data from the user comprises to request the additional input data from the user in response to a determination that one or more of the low-level steps were undeterminable. In other embodiments, the one or more processors are further configured to execute the instructions to exclude, upon having determined that one or more of the low-level steps were undeterminable, the scenario from the validation tool. In still other embodiments, to determine the one or more low-level steps for each of the one or more generated placeholders comprises to (i) render a hypertext markup language (HTML) view of an interface of the scenario and (ii) determine the one or more low-level steps based on the rendered HTML view of the interface of the scenario.

In some embodiments, the offer includes a service template component that defines a set of services and resources required to perform one or more service scenarios of the offer. In other embodiments, to determine the one or more low-level steps for each of the one or more generated placeholders comprises to (i) determine one or more application packages associated with a set of resources defined by the service template component, and (ii) determine at least a portion of the one or more low-level steps based on a set of low-level steps contained within at least one of the one or more application packages. In still other embodiments, the one or more processors are further configured to execute the instructions to identify a set of resource types as a function of the set of services and resources; and determine one or more application packages corresponding to each of the set of resource types, wherein to generate the one or more high-level steps for the one or more scenarios comprises to generate the one or more high-level steps as a function of the one or more application packages determined for each of the set of resource types.

In some embodiments, the one or more scenarios of the offer comprises to at least one of create a customer, buy a subscription for the customer, create a service, assign the service, create a service user, change a subscriptions plan, change a subscription limit, disable the subscription, terminate the subscription, and invoice the customer.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
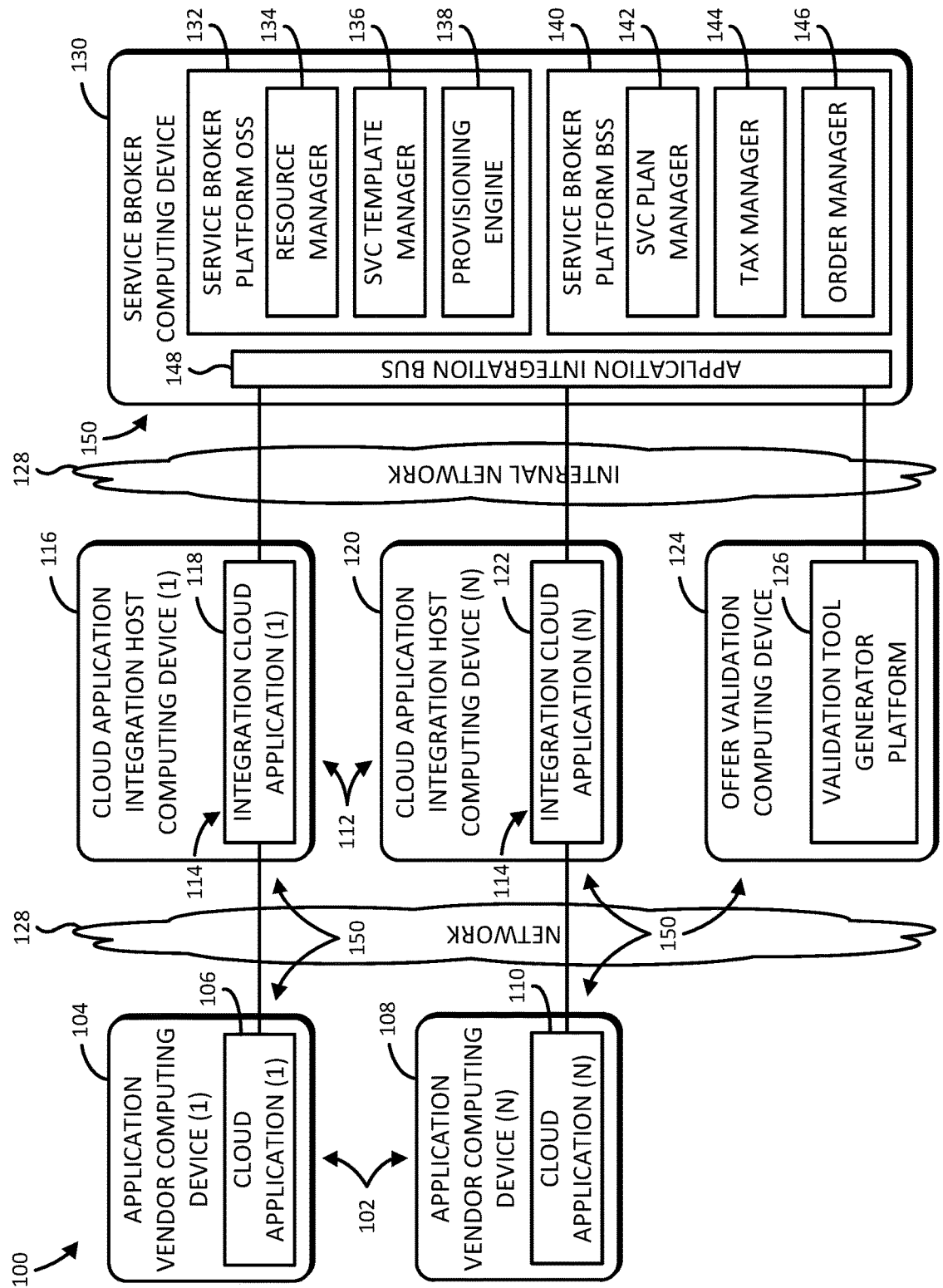
FIG. 1 is a block diagram of an illustrative embodiment of a cloud service brokerage system for automatically validating the functionality of offers of a cloud service brokerage system that includes one or more application vendor computing devices, one or more cloud application integration host computing devices, an offer validation computing device, and a service broker computing device.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a cloud service brokering system 100 for automatically validating the functionality of offers of the cloud service brokerage system 100. The cloud service brokering system 100 includes one or more application vendor computing devices 102, one or more cloud application integration host computing devices 112, an offer validation computing device 124, and a service broker computing device 130, each comprising a computing device 150. In use, a cloud service application associated with a cloud service vendor (e.g., an independent software vendor (ISV)) is a cloud based application.

Generally, to integrate and distribute the cloud service application into a marketplace (e.g., a cloud service broker marketplace), the ISV (e.g., the application vendor associated with an application vendor computing device 102) provides an application package in accordance with one or more various standards supported by the marketplace (e.g., Parallels® Application Packaging Standard (APS)). The application package typically includes metadata, control method descriptions, and content files, which are usable to declare and define the application resources, services, user interface components, and logic of control methods necessary for managing d application resources. Accordingly, various resources, templates, service plans, etc., can be associated therewith by the cloud service broker. Further, based on the application package, the cloud service broker can deploy another integration component—a integration cloud application (see, e.g., the integration cloud applications 114 of FIG. 1).

Such integration cloud applications are configured to translate application programming interface (API) calls with control methods received from the service broker computing device 130 using API calls specific to the respective integration cloud application(s). Accordingly, using the application package and the integration cloud application (e.g., the integration cloud application (1) 118, the integration cloud application (N) 122, etc.), instances of the cloud application can be made available to be licensed (i.e., as a service) to one or more end-users (e.g., a customer, a broker, a re-seller, etc.) via the marketplace. Additionally, in some embodiments, the integration cloud application can be configured by cloud service broker to collaborate with other cloud applications/services/storage (e.g., cloud application (1) 106 and cloud application (N) 110) via modification and extension of their application packages.

There are various instances in which the integration of the cloud applications needs to be tested by the cloud service broker. For example, a integration cloud application may need to be tested prior to being published for sale (e.g., in the cloud service broker marketplace), such as when the cloud application is in a development phase in anticipation of advancing to the production phase. In another example, a integration cloud application may need to be tested subsequent to an update being made. Such tests may include any anticipated service scenario a cloud service broker may encounter, such as creating a customer, buying a subscription for a customer, creating/assigning services, creating service users, changing subscriptions plans/limits, disabling/terminating subscriptions, invoicing, etc.

Additionally, the integration cloud application may need to be tested to validate the functionality of one or more offers. For example, in a situation in which the cloud service broker forms a new offer for a client, the cloud service broker also needs to validate the offer is correctly functioning. Otherwise, the client may experience some difficulties when acquiring or modifying the offer at a later point in time. Such problems could appear not only on the client side, but also on the application vendor's side, such as when an incorrectly functioning component of the user interface of the cloud service broker transmits an incorrect control requests to the application vendor's user interface.

However, unlike present manual testing procedures, the cloud service brokering system 100, or more particularly the offer validation computing device 124 disclosed herein, is configured to generate a validation tool usable to automatically perform the tests. To do so, as will be described in further detail below, the offer validation computing device 124 is configured to generate a validation tool based on the steps used to perform the validation of each service scenario, such as may be performed based on service plan information, service template information, resource information, and the like associated with a particular service scenario. Accordingly, the generated validation tool may be used by an application vendor or a cloud service broker automatically test/validate the various scenarios of the integration application. Such automatic tests/validations of the various scenarios may be performed, for example, at the integration stage, on a new offer, and/or on an update to an existing offer.

The cloud service broker computing device 130 is additionally configured to provide an integration at a user interface level based on the information of the associated user interface components contained in the application package. To do so, the cloud service broker computing device 130 is configured to provide a hybrid user interface with functional user interface components of the respected cloud applications 106, 110. Accordingly, an owner of the cloud service broker computing device 130 (e.g., a cloud service broker) can configure one or more offers for resellers further down the chain. As used herein, an offer is a service plan configured to sell one or more services using application packages. To do so, each offer includes a service template component and a billing component.

The service template component defines a set of services and resources managed by these services from one or more cloud applications/services of application vendors, the amount of resources, a number of user accounts, and other customizations. The billing component defines one or more billing rules, which are to be implemented with the offer. Additionally, an offer predefines user interface representations for clients. In other words, in acquiring an offer, the user will see the integrated user interface with only those cloud applications whose services or resources were identified in the offer. As such, the cloud service broker computing device 130 is configured to validate the functionality of the offer in terms of the functionality associated with the integrated user interface.

As described previously, the illustrative cloud service brokering system 100 includes one or more application vendor computing devices 102 usable to develop and host cloud applications, and one or more cloud application integration host computing device 112 usable to host the associated integration cloud applications. The illustrative application vendor computing devices 102 include a first application vendor computing device 102, designated as application vendor computing device (1) 104, and an "Nth" application vendor computing device 102, designated as application vendor computing device (N) 108. It should be appreciated that the Nth application vendor computing device 102 (i.e., application vendor computing device (N) 108) represents "N" additional application vendor computing device(s) 102, wherein "N" is a positive integer value. It should be further appreciated that, while each of the respective application vendor computing devices 102 is shown as a single computing device 150, one or more of the application vendor computing devices 102 may be comprised of more than one computing device 150.

Each of the application vendor computing devices 102 illustratively shows a respective cloud application. As shown, the illustrative application vendor computing device 104 includes a first cloud application, designated as cloud application (1) 106. Similarly, the illustrative application vendor computing device 108 includes another cloud application, designated as cloud application (N) 110. It should be appreciated that the Nth cloud application (i.e., application vendor computing device (N) 110) represents "N" additional cloud application(s), wherein "N" is a positive integer value.

As described previously, the information about a cloud application (e.g., cloud application (1) 106 and cloud application (N) 110) is presented in the form of an application package, which has been packaged in accordance with one or more various standards supported by the cloud service broker marketplace. It should be appreciated that each application package can have one or more application package instances, which point to the address of the integration application corresponding to the application package. It should be further appreciated that, in some deployment schema, there are several application package instances on several geographical hubs.

As also described previously, each application package is associated with a corresponding integration cloud application, illustratively shown as being hosted on a respective cloud application integration host computing device 112. The illustrative cloud application integration host computing devices 112 include a first cloud application integration host computing device 112, designated as cloud application integration host computing device (1) 116, and an "Nth" cloud application integration host computing device 112, designated as cloud application integration host computing device (N) 120. It should be appreciated that the Nth cloud application integration host computing device 112 (i.e., cloud application integration host computing device (N) 118) represents "N" additional cloud application integration host computing device(s) 112, wherein "N" is a positive integer value. It should be further appreciated that, while each of the respective cloud application integration host computing devices 112 is shown as a single computing device 150, one or more of the cloud application integration host computing devices 112 may be comprised of more than one computing device 150.

Each of the cloud application integration host computing devices 112 is communicatively coupled to an application integration bus 148 of the service broker computing device 130 via a respective communication channel through a portion of the network 128. The application integration bus 148 may be embodied as any type of communication bus usable to integrate cloud applications with cloud service broker platforms (e.g., of the service broker computing device 130) and enable communications between cloud applications. The application integration bus 148 is configured to formulate control requests (e.g., for provisioning, customer registration, assigning new services, etc.) with resources described in the respective application package.

To do so, the application integration bus 148 is configured to route API requests (e.g., provisioning, deleting, etc.) initiated by the cloud service broker computing device 130 to the appropriate integration cloud application 114 (e.g., the integration cloud application (1) 118, the integration cloud application (N) 122, etc.) based on the corresponding address of the applicable integration cloud application 114 (e.g., the integration cloud application (1) 118, the integration cloud application (N) 122, etc.), such that the receiving integration cloud application 114 can translate the received API requests and deliver the translated request to the appropriate cloud application (e.g., the cloud application (1) 106, the cloud application (N) 110, etc.).

Additionally, the application integration bus 148 is configured to receive REST requests translated from an application vendor's API into a corresponding API of the application integration bus 148 by a receiving integration cloud application 114. To do so, the integration cloud application 114 is configured to address the REST request to an endpoint of the application integration bus 148 on behalf of the cloud application (e.g., the cloud application (1) 106, the cloud application (N) 110, etc.) from which the application vendor's API request was received. Further, the application integration bus 148 is configured to generate a unique certificate and private key during installation of each integration cloud application 114 which is usable by the integration cloud application 114 to confirm its identity to the application integration bus 148 when sending REST requests.

The offer validation computing device 124 is also illustratively shown having a communication channel through a portion of the network 128 connecting the offer validation computing device 124 to the application integration bus 148. As such, the offer validation computing device 124 is configured to communicate with the cloud application integration host computing devices 112 via the application integration bus 148. More particularly, a validation tool generator platform 126 of the offer validation computing device 124, which is described in further detail below, is configured to communicate with one or more of the integration cloud applications 114 of the respective cloud application integration host computing devices 112 via the application integration bus 148. The integration cloud applications 114 are configured to translate API calls with control methods from the cloud service broker computing device to API calls specific to the respective integration cloud applications (e.g., one of the integration cloud applications 118, 122).

The illustrative service broker computing device 130 additionally includes a service broker platform operations support system (OSS) 132 and a service broker platform business support system (BSS) 140. The service broker platform OSS 132 is configured to store resource models and perform resource provisioning for the cloud applications. To do so, the illustrative service broker platform OSS 132 includes a resource manager 134, a service template manager 136, and a provisioning engine 138. Each of the resource manager 134, the service template manager 136, and the provisioning engine 138 may be embodied as any type of firmware, hardware, software, circuitry, or combination thereof capable of performing the functions described herein.

The resource manager 134 is configured to manage the resources described in the application packages and associated with the cloud applications (e.g., the integrated cloud applications 106, 110). To do so, the service template manager 136 is configured to manage service templates, which are formed from the resources and associated services from the application packages and are associated with each offer. For example, the resource manager 134 may be configured to manage creation, reading, updating, and deleting (CRUD) operations on the resources. Each service template includes a set of resource types associated with a particular one or more scenarios of an offer. To do so, the resource manager 134 is configured to interpret a resource model of the application package, which provides a full description of the resource types for the respective cloud application and includes operations which may be performed using the resources, as well as ways for asking the corresponding cloud application to provide resources of a particular type.

It should be appreciated that, in some embodiments, the service template manager 136 may be configured to combine resources into more useful sets. The service templates may include additional information, such as instructions on user interface (UI) navigation of the offer, which may include types and locations of graphical UI elements to be displayed to a user on a given UI screen, such as may be usable to perform a particular function of a cloud application. The provisioning engine 138 is configured to perform the provisioning of the identified resources for the cloud application.

The service broker platform BSS 140 is configured to perform billing operations and call the service broker platform OSS 132 for resource provisioning. To do so, the illustrative service broker platform BSS 140 includes a service plan manager 142, a tax manager 144, and an order manager 146. The service plan manager 142 is configured to manage service plans associated with the offer. For example, the service plan manager 142 may be configured to provide the ability to make CRUD operations with offers, resource rates, and to specify prices. The tax manager 144 is configured to manage taxes associated with the cloud services from the offer. For example, the tax manager 144 may be configured to perform tax calculations during invoice creation. The order manager 146 is configured to manage (e.g., create, modify, delete) orders of cloud services from the offer. In an illustrative example, the order manager 146 may create one or more orders and/or invoices based on a service plan. It should be appreciated that one or more of the service plan manager 142, the tax manager 144, and the order manager 146 may be embodied as any type of firmware, hardware, software, circuitry, or combination thereof capable of performing the functions described herein.

As shown in the illustrative cloud service brokering system 100, each of the application vendor computing devices 102, the cloud application integration host computing devices 112, the offer validation computing device 124, and the service broker computing device 130 are embodied as computing devices 150. Accordingly, it should be appreciated that each of the respective computing devices 150 may be embodied as any type of compute and/or storage device capable of performing the functions described herein. Additionally, it should be further appreciated that each of the respective computing devices 150 may be comprised of more than one computing device 150. For example, one or more of the computing devices 150 may be embodied as one or more servers (e.g., stand-alone, rack-mounted, etc.) and/or combination of compute blades and data storage devices (e.g., of a storage area network (SAN)) in a cloud architected network or data center, while one or more of the other computing devices 150 may be embodied as one or more desktop computers, mobile computing devices (e.g., smartphones, wearables, tablets, laptops, notebooks, etc.), or any other type of "smart" or otherwise Internet-connected devices.

Figure 2:
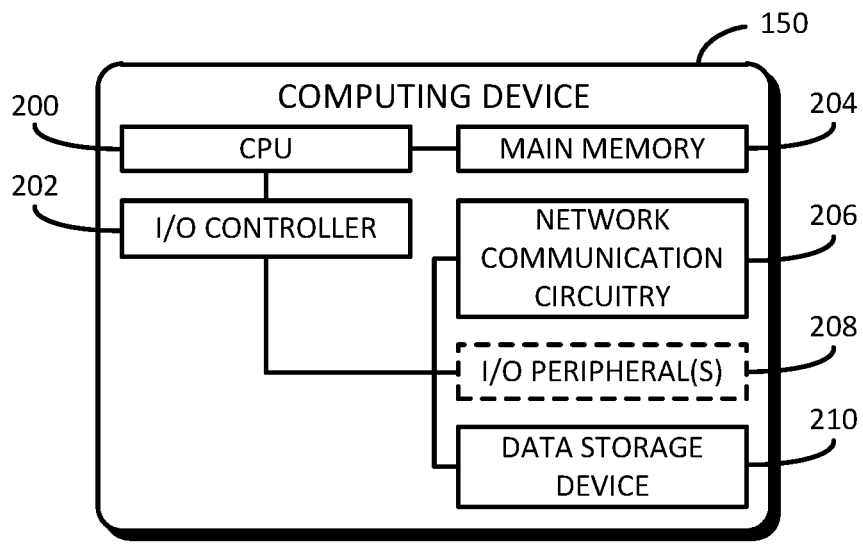
FIG. 2 is a block diagram of an illustrative environment of the offer validation computing device of FIG. 1.

Referring now to FIG. 2, an illustrative embodiment of a computing device 150 representative of one or more of the application vendor computing devices 102, the cloud application integration host computing devices 112, the offer validation computing device 124, and the service broker computing device 130 is shown. The illustrative computing device 150 includes a central processing unit (CPU) 200, an input/output (I/O) controller 202, a memory 204, a network communication circuitry 206, and a data storage device 210, as well as, in some embodiments, one or more I/O peripherals 208. In some embodiments, one or more of the illustrative components may be combined on a single system-on-a-chip (SoC) on a single integrated circuit (IC). It should be appreciated that alternative embodiments may include additional, fewer, and/or alternative components to those of the illustrative computing device 150, such as a graphics processing unit (GPU), a power supply, etc., which are not shown to preserve clarity of the description. It should be further appreciated that the type of storage/compute components of the respective computing device 150 may be predicated upon the type and intended use of the respective computing device 150.

The CPU 200, or processor, may be embodied as any type of hardware or combination of circuitry capable of processing data. Accordingly, the CPU 200 may include one processing core (not shown) in a single-core processor architecture, or multiple processing cores in a multi-core processor architecture. Irrespective of the number of processing cores, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations, graphics processing operations, etc.), rather than commands issued to/from the CPU 200.

The I/O controller 202, or I/O interface, may be embodied as any type of computer hardware or combination of circuitry capable of interfacing between input/output devices and the computing device 150. Illustratively, the I/O controller 202 is configured to receive input/output requests from the CPU 200, and send control signals to the respective input/output devices, thereby managing the data flow to/from the computing device 150.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 150 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 150 to a computer network (e.g., the network 128), as well as other computing devices of the cloud service marketplace and brokering system 100.

The one or more I/O peripherals 208 may be embodied as any auxiliary device configured to connect to and communicate with the computing device 150. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output).

In some embodiments, the I/O peripherals 208 may be connected to the computing device 150 via a cable (e.g., a ribbon cable, a wire, a universal serial bus (USB) cable, a high-definition multimedia interface (HDMI) cable, etc.) of the computing device 150. In such embodiments, the cable is connected to a corresponding port (not shown) of the computing device 150 for which the communications made therebetween can be managed by the I/O controller 202. In alternative embodiments, the I/O peripherals 208 may be connected to the computing device 150 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

Referring back to FIG. 1, the illustrative cloud service brokering system 100 includes a network 128 that is usable for the computing devices 150 (i.e., the application vendor computing devices 102, the cloud application integration host computing devices 112, the offer validation computing device 124, and the service broker computing device 130) to communicate as described herein. The network 128 may be implemented as any type of wired and/or wireless network, including a local area network (LAN), a wide area network (WAN), a metropolitan area network (MAN), a global network (the Internet), etc., utilizing any wired and/or wireless communication technologies and network communication transmission protocols. Accordingly, the network 128 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

For example, one or more of such network computing devices may be configured to couple one or more of the application vendor computing devices 102, the cloud application integration host computing devices 112, the offer validation computing device 124, and/or the service broker computing device 130 to the network 128 in a LAN configuration using wired (e.g., Ethernet, token ring, etc.) and/or a WLAN configuration using wireless (e.g., Bluetooth®, Wi-Fi®, wireless broadband, ZigBee®, etc.) communication technologies and associated protocols. In furtherance of the example, a LAN configuration may be coupled (e.g., via coaxial, mobile telephony, fiber, etc.) to one or more larger area networks (e.g., WANs, metropolitan area networks (MANs), the Internet, etc.) via additional network computing devices of the network 128. It should be appreciated that one or more of the network computing devices and/or network configurations may be virtualized (e.g., a virtual switch, a virtual LAN, etc.).

Figure 3:
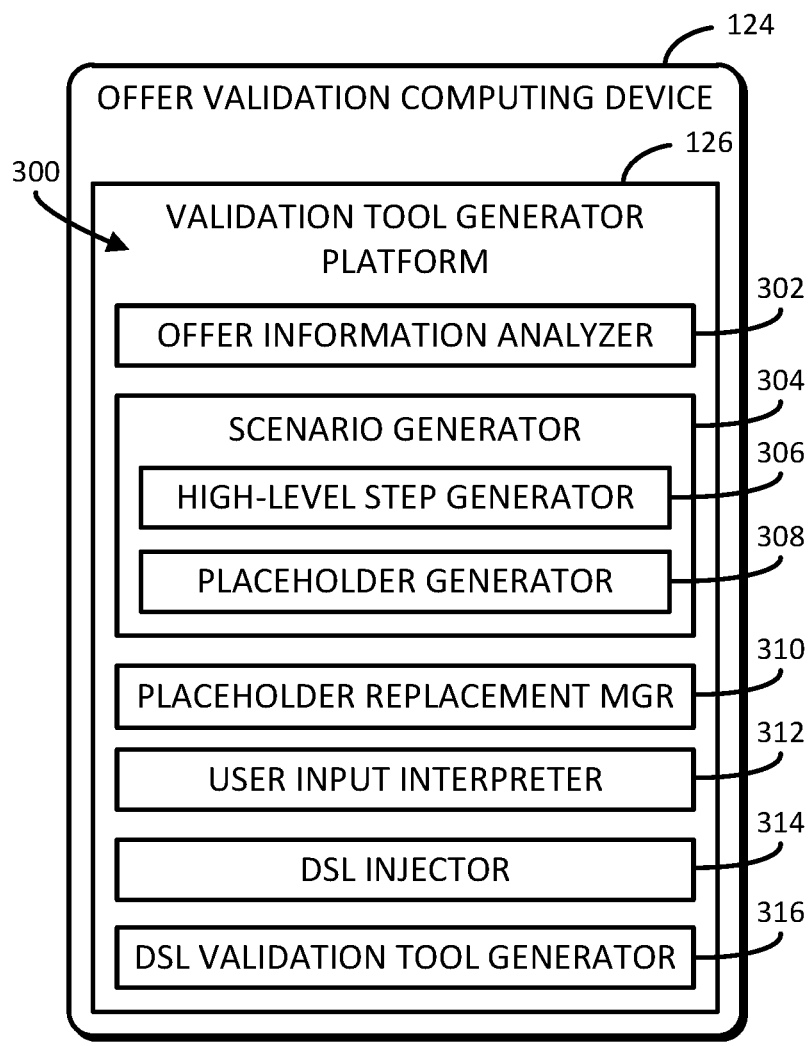
FIG. 3 is a block diagram of an illustrative embodiment of one of the computing devices of the cloud service brokerage system of FIG. 1.

Referring now to FIG. 3, an illustrative environment 300 of the offer validation computing device is shown. The illustrative environment 300 includes the validation tool generator platform 126 of FIG. 1, which may be embodied as any type of firmware, hardware, software, circuitry, or combination thereof capable of performing the functions described herein. The illustrative validation tool generator platform 126 includes an offer information analyzer 302, a scenario generator 304, a placeholder replacement manager 310, a user input interpreter 312, a domain specific language (DSL) injector 314, and a DSL validation tool manager 316. Each of the offer information analyzer 302, the scenario generator 304, the placeholder replacement manager 310, the user input interpreter 312, the DSL injector 314, and the DSL validation tool manager 316 may be embodied as any type of firmware, hardware, software, circuitry, or combination thereof.

In some embodiments, one or more of the offer information analyzer 302, the scenario generator 304, the placeholder replacement manager 310, the user input interpreter 312, the DSL injector 314, and the DSL validation tool manager 316 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein. It should be appreciated that the environment 300 may additionally include one or more other structures usable to store at least a portion of the data elements described herein (e.g., a database) such that the data can be accessed, managed, and updated as appropriate. However, such structures are not shown herein to preserve clarity of the description.

The offer information analyzer 302 is configured to analyze information associated with a cloud service application offer. Such offer information may include service plan information and service template information for which resource information associated with the offer can be identified. For example, the offer information analyzer 302 may be configured to retrieve a service template associated with the cloud service application offer (i.e., from the application package) and retrieve a set of resource types as a function of the service template contents. Additionally, the offer information analyzer 302 is configured to identify any application packages which own any of the retrieved set of resource types.

The scenario generator 304 is configured to generate a set of scenarios as a function of the results of the analysis of the information associated with the cloud service application offer, such as may be performed by the offer information analyzer 302. To do so, the illustrative scenario generator 304 includes a high-level step generator 306 and a placeholder generator 308. The high-level step generator 306 is configured to generate any number of high-level steps that may be required to perform a particular scenario. Such high-level steps are typically considered common, in that they can typically be performed without any external inputs (e.g., user information) that may be required during the performance of a particular scenario.

These high-level steps are defined by the various scenarios carried out by one or more components of the service broker computing device 130 as described herein, including, but not limited to provisioning, customer registration, assigning new services, etc. For example, high-level steps may be presented as a multi-step wizard (i.e., a multi-step help feature), such as a wizard of account creation, subscription creation, and creation of service users with assigned services, etc. It should be appreciated that some high-level steps can be extended by other cloud applications, such as by embedding their associated user interface elements in an associated user interface via the associated application package. It should be further appreciated that some high-level steps do not have such integration points and can be generated without any knowledge of other cloud applications.

The placeholder generator 308 is configured to generate placeholders, or tags, for each scenario which are usable to designate steps that are not high-level steps. Such non-high-level steps (i.e., low-level steps) are typically considered uncommon, such that they generally require external input from a user during the performance of the associated scenario, such as may be stored as scripts in the application package. For example, such required external inputs may include types/amount of physical and/or virtual hardware resources to allocate.

As noted previously, each application package typically includes a description of one or more user interface components associated with the corresponding cloud application and metadata. While preparing integration packages, an ISV can choose a number of predefined low-level steps from a number of predefined low-level steps for describing an integration of the UI elements of the ISV with UI elements of the platform (e.g., a cloud service broker platform (not shown) of the service broker computing device 130) on which the application package is being managed. Additionally, the metadata of the application packages typically includes instructions about mapping of these low-level steps with placeholders associated with the validation of the offer.

In an illustrative example, during virtual private server (VPS) provisioning of a scenario for purchasing a service, certain input may be required that can only be input via a user, such as physical/virtual hardware resources to allocate (e.g., an amount of memory, an amount of disk space, a number of CPU cores, etc.), a VPS name, etc. It should be appreciated that a given scenario may include any number of high-level steps and placeholders.

The placeholder replacement manager 310 is configured to replace generated placeholders (e.g., as may have been generated by the placeholder generator 308 of the scenario generator 304) with a sequence of low-level steps using DSL based on the resources associated with the offer (e.g., as may be determined by the offer information analyzer 302). To do so, the placeholder replacement manager 310 is configured to identify the placeholders, determine a sequence of low-level DSL steps (e.g., using a business readable DSL, such as Gherkin) for each placeholder. Accordingly, the low-level steps can be incorporated into test cases of the validation tool usable to automatically validate the corresponding offer.

In some embodiments, the placeholder replacement manager 310 is configured to determine the low-level steps based on a rendered view of the interface(s) corresponding to the placeholder. For example, the placeholder replacement manager 310 may be configured to render a hypertext markup language (HTML) view of the interface such that a series of low-level steps may be determined therefrom. Additionally, the placeholder replacement manager 310 is configured to replace the corresponding placeholder with the determined low-level steps. It should be appreciated that the low-level steps are generally small enough that nearly any single high-level step can be constructed from them.

The placeholder replacement manager 310 is further configured to replace generated placeholders as a function of received user input. For example, under certain conditions, the placeholder replacement manager 310 may not support a particular placeholder or is otherwise unable to determine the low-level steps necessary to replace the generated placeholder. Under such conditions, the placeholder replacement manager 310 may request and receive user input (e.g., via the user input interpreter 312) that is usable to determine the low-level steps for a placeholder and replace the placeholder with the user-input based determined low-level steps.

The user input interpreter 312 is configured to receive and interpret input received from a user (e.g., a developer, an administrator, cloud service broker etc.) for those low-level steps requiring user input (i.e., for which they could not be automatically determined. To do so, the user input interpreter 310 is configured to communicate with the user via an interface such that the user input interpreter 310 can prompt the user to provide the necessary input(s) and receive the provided input(s). Additionally, the user input interpreter 310 is configured to perform any conversions on the data received that may be necessary to generate the respective low-level steps.

The DSL validation tool generator 316 is configured to generate the validation tool. To do so, the DSL validation tool generator 316 is configured to package a Web driver usable to run a Web browser to display and navigate (e.g., through a cloud service broker platform (not shown) of the cloud service broker computing device 130 of FIG. 1), and service specific screens of the automatic validation. Accordingly, the generated validation tool can interpret the low-level steps (e.g., the Gherkin generated steps using the Cucumber framework) packaged with the applicable scenarios, start a Web browser on the computing device from which the generated validation tool was launched, and navigate through the interfaces, simulating behavior of the reseller and/or end user to test each scenario of the offer associated with the validation tool.

Figure 4A:
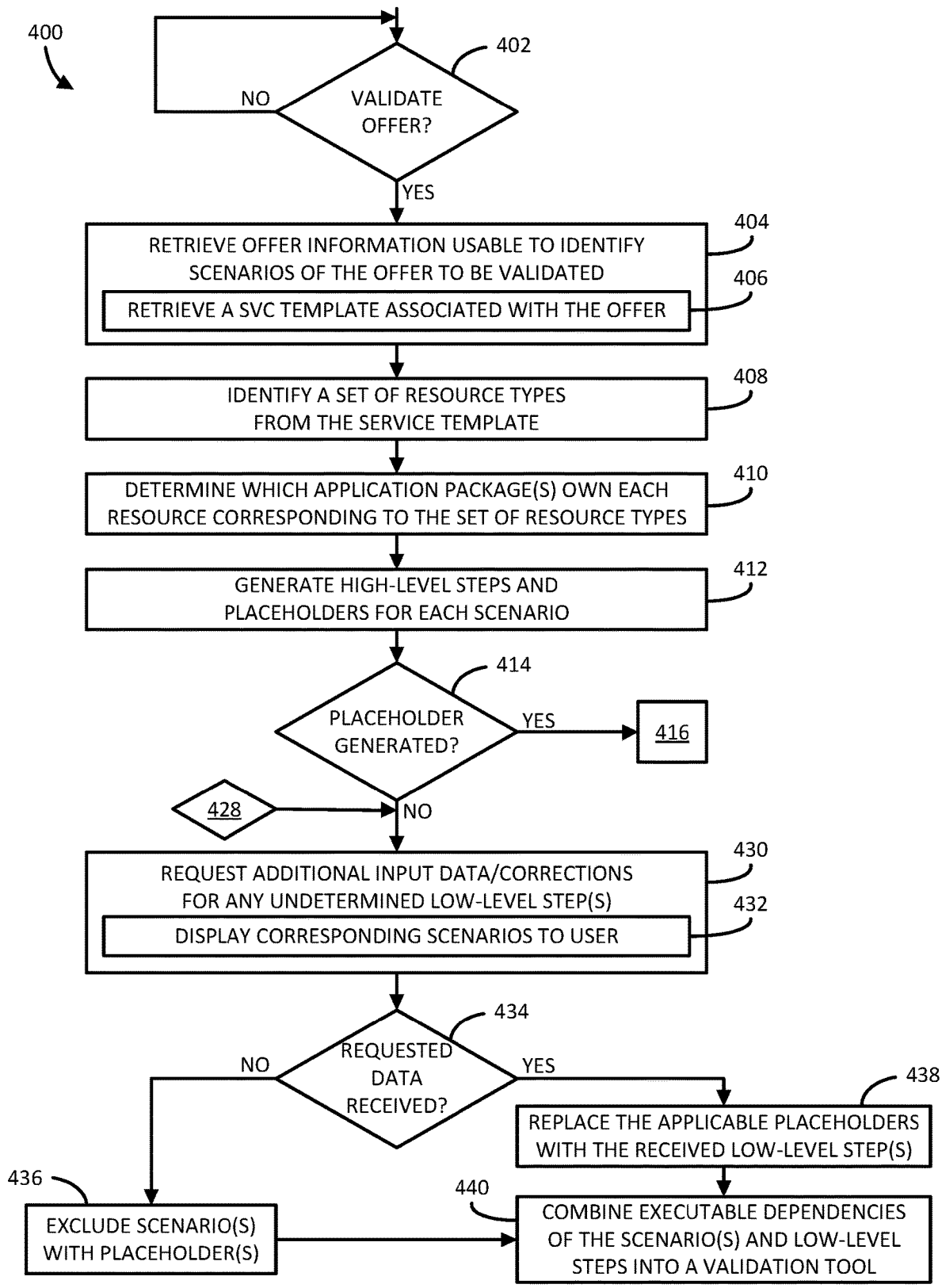
FIGS. 4A and 4B are a schematic flow diagram of an illustrative method for generating a validation tool for automatically validating cloud applications to be integrated via corresponding integration applications into a cloud service brokerage system that may be performed by the offer validation computing device of FIGS. 1 and 2.
Figure 4B:
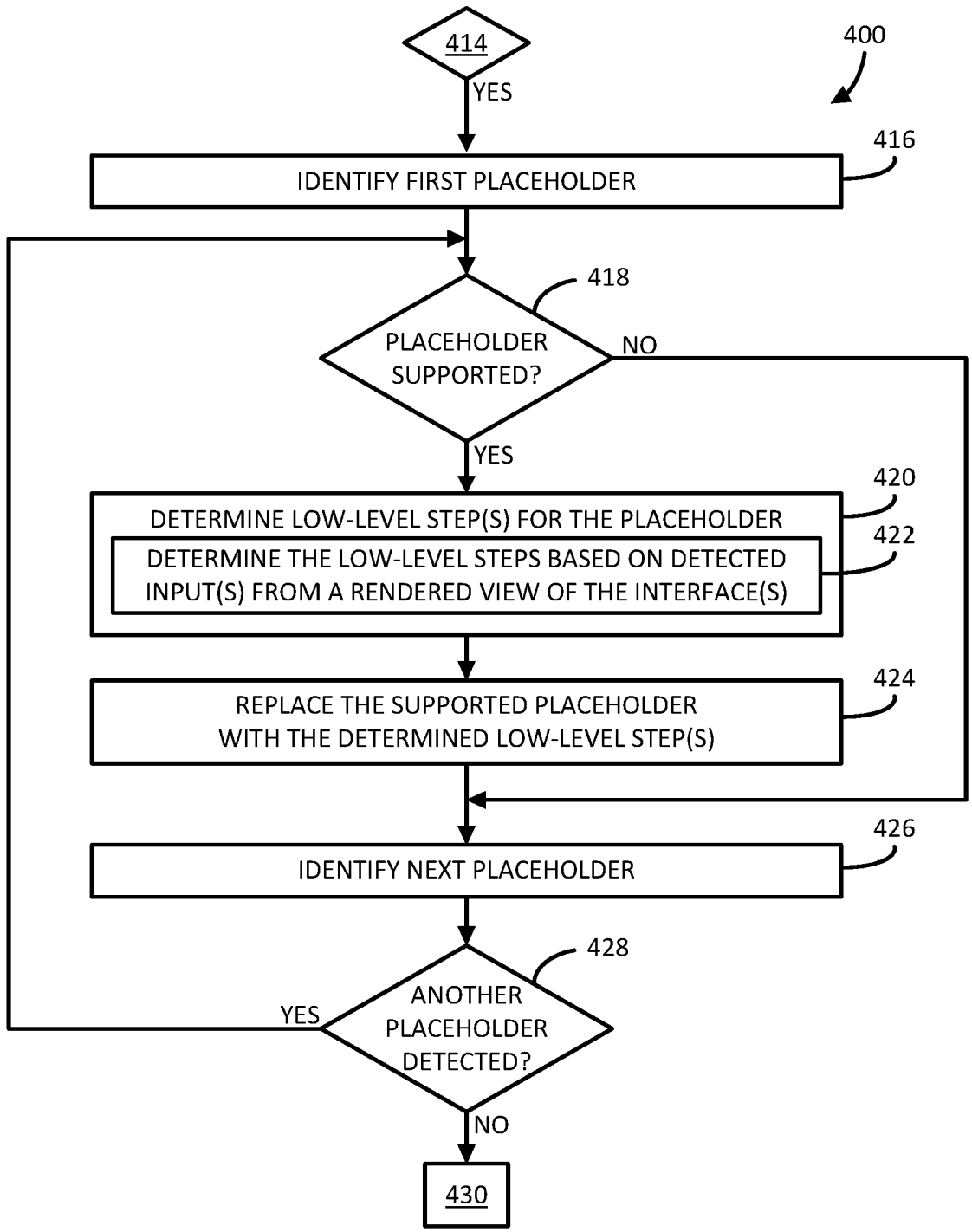

Referring now to FIGS. 4A and 4B, an illustrative method 400 is provided for generating a validation tool for automatically validating cloud applications to be integrated into a cloud service brokerage system (e.g., the cloud service brokerage system 100 of FIG. 1) that may be performed by the offer validation computing device 124, or more particularly by one or more of the components of the validation tool generator platform 126 of the offer validation computing device 124 (e.g., one or more of the components of the illustrative environment 300 of FIG. 3). The method 400 begins in block 402, in which the validation tool generator platform 126 determines whether to validate a cloud service application offer (i.e., a service plan corresponding to a cloud application). It should be appreciated that the offer represents a service plan that includes a service template and billing information.

If the validation tool generator platform 126 determines to validate the offer, the method 400 advances to block 404, in which the validation tool generator platform 126 retrieves offer information usable to identify one or more scenarios of the offer to be validated. For example, in block 406, the validation tool generator platform 126 retrieves a service template associated with the offer and/or user interface information associated with the offer or more particularly the one or more scenarios of the offer.

As described previously, the service template includes a set of resource types associated with a particular one or more of the scenarios. It should be appreciated that the offer information may include additional information, such as billing information (e.g., how to charge, costs, charge frequency, billing model, etc.) which may be provided by the service broker. In block 408, the validation tool generator platform 126 identifies a set of resource types associated with the offer based on the information contained in the service template retrieved in block 406. In block 410, the validation tool generator platform 126 determines which application packages own (e.g., describe) each of the resources identified in the set of resource types in block 408.

As described previously, each of the scenarios include any operations/functions that a cloud service broker may encounter when interfacing with one of the cloud applications 106, 110 of FIG. 1, such as creating a new customer, buying a subscription for a customer, creating/assigning services, creating service users, changing subscriptions plans/limits, disabling/terminating subscriptions, invoicing, etc. As also described previously, to generate the scenarios requires identifying the individual steps to be undertaken to perform each scenario. Some of the steps are high-level steps for performing common steps of each generated scenario, such as those steps which do not require user input for completion. Other steps are less common steps, such as those steps which require user input or rely on another application package to complete. Accordingly, in block 412, the validation tool generator platform 126 generates the high-level steps and any placeholders associated with each scenario of the offer to be validated.

In block 414, the validation tool generator platform 126 determines whether any placeholders were generated for any scenario. If not, the method 400 advances to block 430, which is described in further detail below; otherwise, the method 400 branches to block 416, which is shown in FIG. 4B. In block 416, the validation tool generator platform 126 identifies the first placeholder. In block 418, the validation tool generator platform 126 determines whether the identified placeholder is supported. If not, the method 400 advances to block 426 in which the validation tool generator platform 126 determines whether another placeholder is detected. Otherwise, if the validation tool generator platform 126 determines the identified placeholder is supported, the method 400 advances to block 420.

In block 420, the validation tool generator platform 126 determines one or more low-level steps for the identified placeholder. For example, in block 422, the validation tool generator platform 126 determines the low-level step(s) based on one or more detected inputs from a rendered view of the interface(s) associated with a scenario. For example, the validation tool generator platform 126 may be configured to render a hypertext markup language (HTML) view of the interface. Accordingly, assuming the interface form will be filled input by input, it may be possible to generate a sequence of low-level steps (e.g., low-level DSL steps using Gherkin) for filling the inputs using pre-generated information with such information usable to test the applicable step(s)/scenario. However, in some instances it may not be possible to use predefined values. As such, in some embodiments, the validation tool generator platform 126 may be configured to generate random values, such as may be affixed to one or more declared variables, or may be otherwise based on one or more declared variables, to minimize the risk of duplication. For example, an identifying character (e.g., a "$" or some other identifying symbol) may be used to identify such a variable name, as opposed to a raw value.

As described previously, application packages typically include metadata, control method descriptions, and content files, which are usable to declare and define the application resources, services, user interface components, and logic of control methods necessary for managing cloud application resources. Additionally, low-level steps may be stored in the application packages. Accordingly, those application packages identified in block 410 may be used to identify one or more of the low-level steps associated with one or more scenarios.

In block 424, the validation tool generator platform 126 replaces the identified placeholder with the determined low-level step(s). In block 426, the validation tool generator platform 126 identifies the next placeholder. In block 428, the validation tool generator platform 126 determines whether the placeholder was detected. If another placeholder has been detected, the method 400 returns to block 418 to determine whether the other detected placeholder is supported. Otherwise, if another placeholder is not detected, the method 400 branches to block 430, shown in FIG. 4A.

In block 430, in such embodiments in which one or more low-level steps were not supported or otherwise not determinable by the validation tool generator platform 126, the validation tool generator platform 126 requests information from a user to determine the low-level steps for each applicable placeholder for which the low-level step(s) were not determinable. In other words, some low-level steps may not have been fully determinable without user input and/or confirmation of the accuracy of at least a portion of the low-low steps may be required. Accordingly, for example, in block 432, the validation tool generator platform 126 may display (e.g., via a user interface) a corresponding scenario to the user (e.g. cloud service broker) and requests the additional input data and/or corrections associated therewith. It should be appreciated that, in some embodiments, none of the scenarios may not include a placeholder, in which case the method 400 may advance directly from block 414 to block 440, which is described below.

In block 434, the validation tool generator platform 126 determines whether the requested information has been received. If not, the method 400 branches to block 436, in which the validation tool generator platform 126 excludes those scenarios with placeholder(s) (i.e., as opposed to low-level step(s)) from being validated before the method proceeds to block 440, which is described below. Otherwise, if the validation tool generator platform 126 determines the information corresponding to the requested low-level steps has been received, the method 400 branches to block 438, in which the validation tool generator platform 126 replaces the applicable placeholder(s) based on the received data before the method advances to block 440. In block 440, the validation tool generator platform 126 combines the execution dependencies of the cloud service application offer with the low-level steps into the validation tool. In other words, the generated high-level steps and low-level steps (i.e., those low-level steps associated with scenarios that were not excluded) are packaged into the validation tool with the associated execution dependencies of the scenarios.

Figure 5:
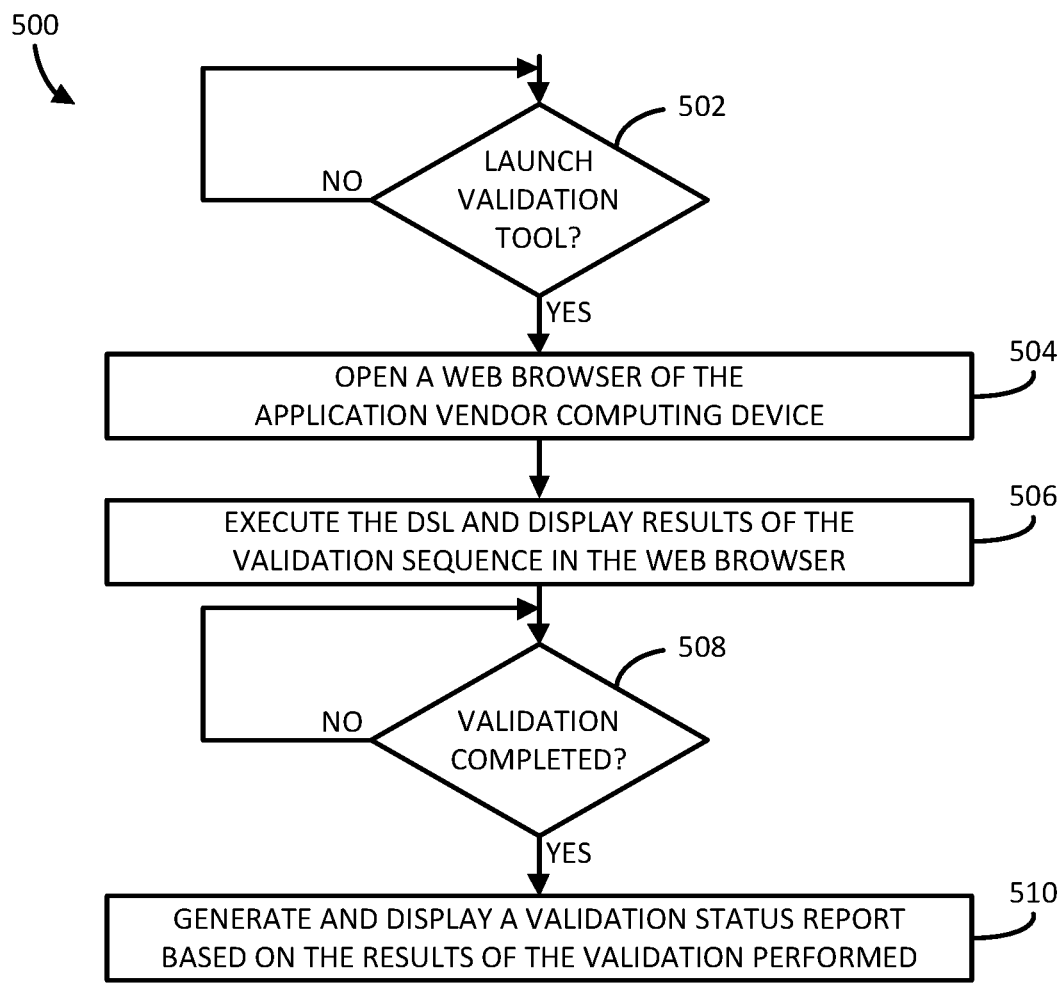
FIG. 5 is a schematic flow diagram of an illustrative method for automatically validating cloud applications to be integrated into a cloud service brokerage system that may be performed by the service broker computing device of FIG. 1.

Referring now to FIG. 5, an illustrative method 500 is provided for automatically validating cloud applications to be integrated into a cloud service brokerage system (e.g., the cloud service brokerage system 100 of FIG. 1) that may be performed by one of the application vendor computing devices 102 (e.g., via an associated cloud application development interface). It should be appreciated that while the method 500 is described herein as being performed by one of the application vendor computing devices 102, it should be appreciated that another computing device (e.g., the cloud service broker computing device 130 of FIG. 1) and/or platform (e.g., a cloud service broker platform (not shown) of the cloud service broker computing device 130 of FIG. 1) may be configured to automatically validate cloud applications, in other embodiments. The method 500 begins in block 502, in which the application vendor computing device 102 determines whether to launch the validation tool. Accordingly, it should be appreciated that, the validation tool has been generated (e.g., as described above in reference to the method 400 of FIG. 4) and downloaded to the cloud service broker computing device 130 prior to the execution of the method 500.

If the cloud service broker computing device 130 determines whether to launch the validation tool (e.g., based on a user input determinable to initiate the execution of the validation tool), the method 500 advances to block 504. In block 504, the cloud service broker computing device 130 launches or otherwise opens a web browser of the cloud service broker computing device 130. In block 506, the cloud service broker computing device 130 executes the DSL that was packaged into the validation tool and displays results of the validation sequence in the web browser such that a user of the validation tool can observe the validation tests being automatically performed.

In block 508, the cloud service broker computing device 130 determines whether the validation sequence has completed. If so, the method 500 advances to block 510 in which the cloud service broker computing device 130 generates and displays a validation status report based on the results of the automatic validation performed by the validation tool for the respective cloud service application offer.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A cloud service brokering system, comprising:
    one or more application vendor computing devices operative to host a vendor cloud application;
    one or more cloud application integration host computing devices coupled to the one or more vendor computing devices via a data communication network, each of the cloud application integration host computing devices executing an integration cloud application;
    wherein the one or more vendor computing devices are operative to transmit to one of the one or more cloud application host computing devices information about the vendor cloud application in the form of an application package, which has been packaged in accordance with a standard supported by the cloud service brokering service;
    a service broker computing device comprising an application integration bus, wherein the service broker computing device is coupled to the cloud application integration host computing devices via the application integration bus for data communication therebetween;
    wherein the integration cloud applications are configured to translate application programming interface (API) calls with control methods received from the service broker computing device using API calls specific to the respective integration cloud application;
    an offer validation computing device coupled to the one or more vendor computing devices and the one or more cloud application integration host computing devices via the data communication network, the offer validation computing device further coupled to the service broker computing device via the application integration bus for data communication therebetween;
    wherein the offer validation computing device is operative to automatically validate the functionality of offers in the cloud service brokerage system, the offer validation computing device further comprising:
        one or more computer-readable medium comprising instructions; and
        one or more processors coupled with the one or more computer-readable medium and configured to execute the instructions to:
            identify one or more scenarios of an offer to be validated, wherein the offer is associated with a service plan corresponding to a cloud application;
            generate, in response to having determined that at least one of the one or more scenarios includes one or more placeholders, the one or more placeholders for the respective one or more scenarios;
            determine one or more low-level steps for each of the one or more placeholders;
            replace each of the determined one or more placeholders with a corresponding one or more associated low-level steps of the determined one or more low-level steps; and
            package the one or more associated low-level steps and the one or more high-level steps into a validation tool usable to automatically validate the functionality of the one or more scenarios of the offer.

2. The cloud service brokering system of claim 1, wherein the one or more processors are further configured to execute the instructions to:
    request, via a user interface of the offer validation computing device and upon having determined the one or more low-level steps, additional input data from a user; and
    receive, via the user interface, the additional input data requested from the user,
    wherein to replace each of the one or more generated placeholders comprises to replace at least one of the one or more generated placeholders based on the additional input data received from the user.

3. The cloud service brokering system of claim 2, wherein to request the additional input data from the user comprises to request the additional input data from the user in response to a determination that one or more of the low-level steps were undeterminable.

4. The cloud service brokering system of claim 1, wherein the one or more processors are further configured to execute the instructions to exclude, upon having determined that one or more of the low-level steps were undeterminable, the scenario from the validation tool.

5. The cloud service brokering system of claim 1, wherein to determine the one or more low-level steps for each of the one or more generated placeholders comprises to (i) render a hypertext markup language (HTML) view of an interface of the scenario and (ii) determine the one or more low-level steps based on the rendered HTML view of the interface of the scenario.

6. The cloud service brokering system of claim 1, wherein the offer includes a service template component that defines a set of services and resources required to perform one or more service scenarios of the offer.

7. The cloud service brokering system of claim 6, wherein to determine the one or more low-level steps for each of the one or more generated placeholders comprises to (i) determine one or more application packages associated with a set of resources defined by the service template component, and (ii) determine at least a portion of the one or more low-level steps based on a set of low-level steps contained within at least one of the one or more application packages.

8. The offer validation computing device of claim 6, wherein the one or more processors are further configured to execute the instructions to:

identify a set of resource types as a function of the set of services and resources; and determine one or more application packages corresponding to each of the set of resource types, wherein to generate the one or more high-level steps for the one or more scenarios comprises to generate the one or more high-level steps as a function of the one or more application packages determined for each of the set of resource types.

9. The offer validation computing device of claim 1, wherein the one or more scenarios of the offer comprises to at least one of create a customer, buy a subscription for the customer, create a service, assign the service, create a service user, change a subscriptions plan, change a subscription limit, disable the subscription, terminate the subscription, and invoice the customer.

* * * * *